Patented Aug. 28, 1923.

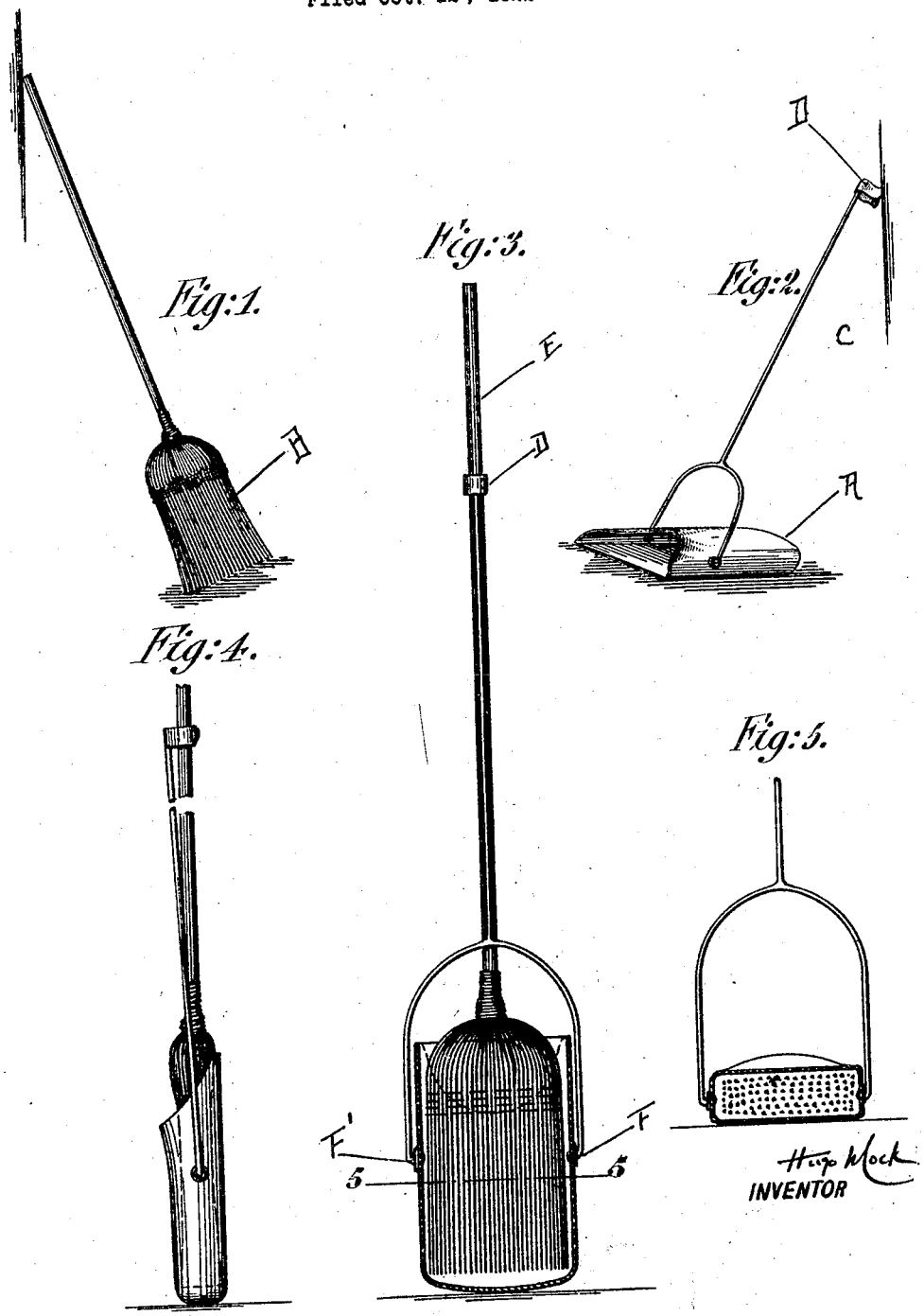

1,466,454

UNITED STATES PATENT OFFICE.

HUGO MOCK, OF NEW YORK, N. Y.

DUSTPAN.

Application filed October 12, 1922. Serial No. 594,069.

*To all whom it may concern:*

Be it known that I, HUGO MOCK, a citizen of the United States, residing at 930 St. Nicholas Avenue, New York, in the county of New York and State of New York, have invented certain new and useful Improvements in Dustpans, of which the following is a specification.

This invention relates to dust pans and has for its object the provision of a dust pan which will also be useful as a broom cover.

Further objects of the invention will be apparent from the drawings, in which—

Figure 1 is a perspective view of an ordinary broom,

Figure 2 is a perspective view of my improved dust pan positioned on the floor,

Figure 3 is a perspective view of the dust pan attached to and covering the head of the broom, Figure 4 is a side view of the dust pan and broom shown in Figure 3, and Figure 5 is a sectional view along the line 5—5 of Figure 3.

A represents the dust pan made of such shape that it will readily slip over and confine the head of the broom B. The dust pan has a bifurcated handle C to the end of which is attached the spring clip D which fits over the handle of the broom E. The handle of the dust pan C is pivotally mounted so as to swing in the dust pan at the points F and F'.

This dust pan differs radically in shape from all other dust pans hitherto known in that its outer contour is adapted to closely cover the broom and protect the fibers of the broom when same is not in use. As shown in Figure 3, the broom can be supported as desired within the dust pan, so that the fibers of the broom do not rest upon the floor and will therefore retain their shape. It is also evident that the broom and cover illustrated can be supported in the reverse position, if desired.

By this improved combination of dust pan and broom, there is procured economy of space, the broom is kept in good condition and cleanliness is also secured.

What I claim and desire to secure by Letters Patent is:—

1. A dust pan of thin elastic metal of elongated tubular form having closed bottom and having the general contour of and conforming to the head of a broom to receive the latter with its acting face adjacent the said closed bottom, means cooperating with the handle of the broom to hold the broom with said acting face out of contact with said bottom, and a handle pivotally connected with the outer wall of the dust pan and carrying said means said dust pan being freely movable in both directions upon the handle.

2. A dust pan having a general elongated contour conforming to the head of a broom, open at one end and closed at the other, a handle pivoted to the dust pan, and a clamp carried by said handle to grasp the handle of a broom disposed lengthwise within said dust pan.

3. A dust pan having one end open and the other end closed and conforming in contour to the head of a broom, the closed end of said dust pan enveloping said head, the open end of said dust pan being partially cut away on its upper side and a handle provided with means for attachment to the handle of a broom.

In testimony whereof I hereunto affix my signature.

HUGO MOCK.